United States Patent [19]

Caldwell et al.

[11] Patent Number: 4,788,558

[45] Date of Patent: Nov. 29, 1988

[54] METHOD AND APPARATUS FOR CONTROLLING TENSION IN TAPE PROGRESSED ALONG A FEED PATH

[75] Inventors: Edward D. Caldwell, Seattle; David A. Ballard, Federal Way, both of Wash.

[73] Assignee: Intermec Corporation, Lynnwood, Wash.

[21] Appl. No.: 12,209

[22] Filed: Feb. 6, 1987

[51] Int. Cl.[4] .............................................. G01D 15/00

[52] U.S. Cl. ................................ 346/76 PH; 400/234; 242/75.51

[58] Field of Search .................... 242/75.5, 75.51, 75.2, 242/191; 346/76 PH, 105, 106, 134, 136; 400/223, 225, 234; 219/216 PH; 250/317.1, 319

[56] References Cited

U.S. PATENT DOCUMENTS

| | | | |
|---|---|---|---|
| 3,704,401 | 11/1972 | Miller | 242/75.51 |
| 4,000,804 | 1/1977 | Zaltieri | 346/76 PH |
| 4,025,830 | 5/1977 | Delaporte | 346/76 PH |
| 4,294,552 | 10/1981 | Mako | 346/76 PH |
| 4,313,683 | 2/1982 | Brown et al. | 346/76 PH |
| 4,479,081 | 10/1984 | Harris | 346/76 PH |
| 4,499,476 | 2/1985 | Inui et al. | 346/76 PH |
| 4,505,603 | 3/1985 | Yana | 346/76 PH |
| 4,507,666 | 3/1985 | Kondo et al. | 346/76 PH |
| 4,507,667 | 3/1985 | Tsuboi | 346/76 PH |

*Primary Examiner*—Arthur G. Evans

*Attorney, Agent, or Firm*—Seed and Berry

[57] ABSTRACT

A method and apparatus for controlling the tension in a tape (16, 18) along a feed path between a reel (84, 112) and a processing station (20) is disclosed. A motor (146, 162) having a controllable torque is coupled to the reel. An advancement mechanism (22, 142) advances the tape through the processing station. Sensors (190, 192) produce signals proportional to the advancement of the tape through the processing station as well as the advance of the reel. These signals are compared to produce an indicia of the present operating radius of the tape on the reel, which is dependent upon the amount of tape wound upon the reel. With this indicia determined, empirically derived data can be consulted to determined the energization of the motor necessary to produce a torque that will compensate for the changing tape diameter on the reel, maintaining the tension in the tape substantially constant independent of the transfer of tape with respect to the reel. In a preferred embodiment, this arrangement is employed to control the tension in thermal transfer ribbon (16) and receiving paper (18) between a print roller (22) and their respective reels (146, 162) in a thermal transfer printer (10).

31 Claims, 6 Drawing Sheets

METHOD AND APPARATUS FOR CONTROLLING TENSION IN TAPE PROGRESSED ALONG A FEED PATH

FIELD OF THE INVENTION

This invention relates to the control of tape being progressed along a tape feed path and, more particularly, to the control of tape tension as the tape is progressed along the feed path.

BACKGROUND OF THE INVENTION

Relatively thin materials, or tapes, have numerous applications that require the processing of relatively large amounts of the tape. For convenience, such tapes are frequently stored on reels both before and after being processed. For example, in thermal transfer printing, thermal transfer ribbon and receiving paper are drawn from separate supply reels through a printing station, where a thermal print head transfers ink from the ribbon to the paper. The printed paper and used ribbon are then loaded onto separate take-up reels for future disposition. Film projection similarly involves the transfer of a film of connected transparencies from a film supply reel through an optical projection station and onto a film take-up reel. Likewise, the paper-processing industry has numerous applications in which relatively thin paper tapes of widely varying width are stored on reels.

Regardless of the particular material involved, or its width, the relatively thin nature of the tape presents certain problems regarding its storage on reels or spools. For example, the processing of tape removed from a spool, or to be stored on another spool, typically occurs at a controlled rate which may be constant or changing. In applications in which the tape is stored on a supply reel before processing, motion of the reel must be controlled to closely correspond to the advance of the tape through the processing station. If the reel is free to pivot about its axis in an uncontrolled manner, slack will be introduced into the tape whenever an abrupt stop at the processing station is experienced. Then, when tape advancement through the processing station resumes, the inertia of the reel will, at least initially, produce a relatively large amount of tension in the tape.

Similar problems occur when the tape is wound upon a take-up reel after exiting the processing station. For example, if the reel's motion and tape advancement through the processing station are independently controlled, the same type of tension discontinuities discussed above may result. In addition, if the advancement of tape through the processing station is controlled by motion of the take-up reel, the position of the tape with respect to the processing station is difficult to control.

Another factor complicating the transfer of tape from a supply reel, through a processing station, and onto a take-up reel in a particular desired manner, involves the changing radius of tape stored on each reel as tape is advanced through the processing station. More particularly, tape cannot be uniformly advanced through a processing station by uniformly rotating the takeup reel. As will be appreciated, when the tape is initially loaded onto the takeup reel, the radius of the reel and tape wound thereon is only slightly greater than that of the reel alone and the reel must travel at a relatively large angular velocity to advance the tape through the processing station at some predetermined rate. As more tape is wound upon the reel, however, the radius of the combined tape and reel increases and a smaller angular velocity of the reel produces the same tape advance rate through the processing station. As will be appreciated, operation of the supply reel presents the converse situation and the angular velocity of the supply reel must continuously be decreased as tape is transferred to the take-up reel, if a particular tape advance rate through the processing station is to be maintained.

Variations in the amount of material stored upon each reel also influence the maintenance of a desired tension in the tape as it is processed. More particularly, when the angular velocities of the supply and take-up reels are not properly adjusted in response to the transfer of tape therebetween, the tension in the tape may undergo substantial fluctuations. For example, if the supply reel is rotated too slowly, or the take-up reel too quickly, tape tension will increase. On the other hand, the tension in the tape may drop abruptly if the supply reel is rotated too quickly or the take-up reel too slowly.

As will be appreciated, the foregoing problems are frequently exacerbated by the relatively thin nature of the tape involved. For example, the thermal transfer ribbon employed in thermal transfer printing is typically on the order of six microns thick. Unlike tapes of thicker, heavier material, such transfer ribbons provide little resistance to the motion of the components that control the advance of the ribbon along a feed path. For that reason, the thermal transfer ribbon is highly susceptible to wrinkling and breakage when the controlling components allow the tape tension to undergo even minor fluctuations. The tape is simply unable to absorb variations in the operation of different system components.

A number of approaches have been taken to control the advance of a reel-stored tape through a feed path. For example, arrangements including a brake and slip clutch are frequently employed when the tape to be processed is received from an undriven supply reel and fed to a driven take-up reel. In such arrangements, a brake is held in frictional contact with a portion of the tape wound upon the supply reel. The brake introduces a back-tension into the tape and prevents the supply reel from overtraveling when the advance of the tape through the processing station is halted. The slip clutch controls the manner in which the take-up reel is driven, causing the reel to slip with respect to the driving element when the tension in the tape exceeds some predetermined level. As will be appreciated, by itself, this relatively simple system is unresponsive to the changing volume of tape wound upon the reels.

Another approach to the control of tape advanced along a feed path is disclosed in U.S. Pat. No. 4,000,804. In that arrangement, the tape progresses from a driven supply reel onto an independently driven take-up reel. The angular velocity of the supply reel is maintained substantially constant while tape is transferred between the reels, as is the torque applied to the take-up reel. Thus, although the tape tension and linear velocity of the tape between the reels varies, some tension is always maintained in the tape. The reference additionally notes, without discussion, that the operation of the motors controlling the reels can be varied as a function of the volume of tape on the spools.

The reel control system disclosed in U.S. Pat. No. 4,000,804, however, has several disadvantages. As noted, by maintaining the angular velocity of the supply reel, as well as the torque applied to the take-up reel, substantially constant, wide variations in the velocity and tension of the tape between the reels is experienced. Even if motor operation were adjusted to correct for these variations, the disclosed arrangement would be relatively ineffective if the processing of the tape that occurs between the reels frequently interrupts the tape's advance. More particularly, feedback corresponding only to tape build-up on the reel does not allow such fluctuating operating characteristics to be compensated for.

U.S. Pat. No. 4,025,830 discloses a web drive system for reversibly transferring a web between two reels. Web tension is maintained in one of two ways. In a first direction of web advance, tension is maintained by operating the reel upon which web material is being deposited at a greater speed than the other reel. When the direction of tape advance is reversed, however, web tension is maintained by applying greater torque to the reel upon which web material is being deposited, stalling the motor that drives the other reel. As will be appreciated, this arrangement also has the disadvantage of failing to compensate for the changing volume of tape wound on the reels.

U.S. Pat. No. 4,294,552 discloses a bidirectional ribbon drive control for transferring ribbon between a pair of reels. Ribbon tension is maintained by applying a drag torque to the reel that is currently supplying ribbon. This drag torque is overcome by a greater torque applied to the take-up reel. While the arrangement thus maintains some tension in the ribbon at all times, it does not compensate for changes in the volume of tape located on the reels.

Several systems have also been developed that clearly use feedback related to the changing volume of tape on a reel that occurs as the tape is processed. For example, U.S. Pat. No. 4,499,476 adds feedback to the brake-and-clutch control system described above. More particularly, electromechanical devices monitor the radius of the tape build-up on each reel and provide feedback signals to the electromagnetic brake and clutch. As a result, the braking force applied to the supply reel by the brake is directly proportional to the volume of tape stored on the reel. Similarly, the electromagnetic clutch is controlled to produce an approximately constant tension in the tape independent of the tape volume on the reel. As will be appreciated, however, this approach does not compensate for variations in tape tension that may result as the tape is started and stopped at a processing station.

Another arrangement employing feedback to control the advance of tape between a supply reel and take-up reel is disclosed in U.S. Pat. No. 4,479,081. In accordance with that arrangement, feedback relating to the angular velocity of the supply reel is used to adjust the angular velocity of the take-up reel to produce relatively uniform linear movement of the tape between the two reels.

While this arrangement does use feedback to control tape advance as a function of some varying system conditions, it does not monitor the tape's advance at a point between the reels. Thus, if nonuniform patterns of tape advance were created at a processing station located between the reels, the system would be unable to correct the resultant tension variations produced in the tape. In light of these considerations, it would be desirable to produce a system able to control the transfer of tape between a single reel and a processing station or between two reels interposed by a processing station, in a manner responsive both to changing tape volume on the reels and variations in the operation of the processing station without mechanical measuring devices such as rheostats.

SUMMARY OF THE INVENTION

In accordance with this invention, an apparatus is disclosed for controlling the tension in tape engaged and positioned by tape advancement means and located in part upon a reel. The apparatus includes a tape advancement indicator that produces a reference signal representative of any changes in position of the tape produced by the tape advancement means. An adjustable torque is applied to the reel by reel control means and a reel control indicator produces a feedback signal representative of any angular change in the position of the reel produced by the torque applied to the reel. Finally, a control signal is produced by processing means in response to the reference signal and feedback signal. This control signal is provided to the reel control means to adjust the torque applied to the reel sufficiently to produce the desired tension in the tape.

In accordance with another aspect of this invention, a thermal transfer printer is provided. The printer is used to transfer marking material from a transfer ribbon onto adjacent receiving paper in a predetermined pattern. The transfer ribbon is transferable between ribbon supply and ribbon take-up reels, while the paper is similarly transferable between paper supply and paper take-up reels. A printer constructed in accordance with the invention includes a thermal print head for effecting the desired transfer of the marking material from the transfer ribbon onto the receiving paper. The print head is positioned adjacent the transfer ribbon between the ribbon supply and ribbon take-up reels. A roller is positioned adjacent the receiving paper and maintains the desired orientation of the transfer ribbon and receiving paper with respect to the print head. A roller motor is coupled to the roller and produces roller motion which maintains the desired orientation of the transfer ribbon and receiving paper with respect to the print head. A ribbon take-up reel motor is coupled to the ribbon take-up reel to apply an adjustable torque thereto. A ribbon and paper advancement indicator produces a reference signal representative of any change in the desired orientation of the ribbon and paper with respect to the print head. A ribbon take-up reel control indicator produces a ribbon take-up feedback signal representative of changes in the angular position of the take-up reel that result from the adjustable torques applied to the reel by its motor. Finally, a ribbon take-up control signal is produced by processing means in response to the reference and feedback signals. The supply control signal is provided to the ribbon take-up reel motor to adjust the torque applied by the motor to produce the desired tension in the ribbon between the roller and take-up reel.

In accordance with a further aspect of this invention, a process of maintaining a desired tension in a tape disposed between an advancement device and a reel includes a number of steps. Operations of the advancement device is monitored and a reference signal produced in response to the operation. Similarly, the operation of the reel is monitored and a first feedback signal is produced in response. The reference signal and first feedback signal are compared to produce a first comparison signal. The operation of the reel is then adjusted in response to the first comparison signal to maintain the desired tension in the tape substantially independent of the operation of the advancement means.

BRIEF DESCRIPTION OF THE DRAWINGS

The invention will presently be described in greater detail, by way of example, with reference to accompanying drawings, wherein.

DETAILED DESCRIPTION OF THE EMBODIMENT

Figure 1:
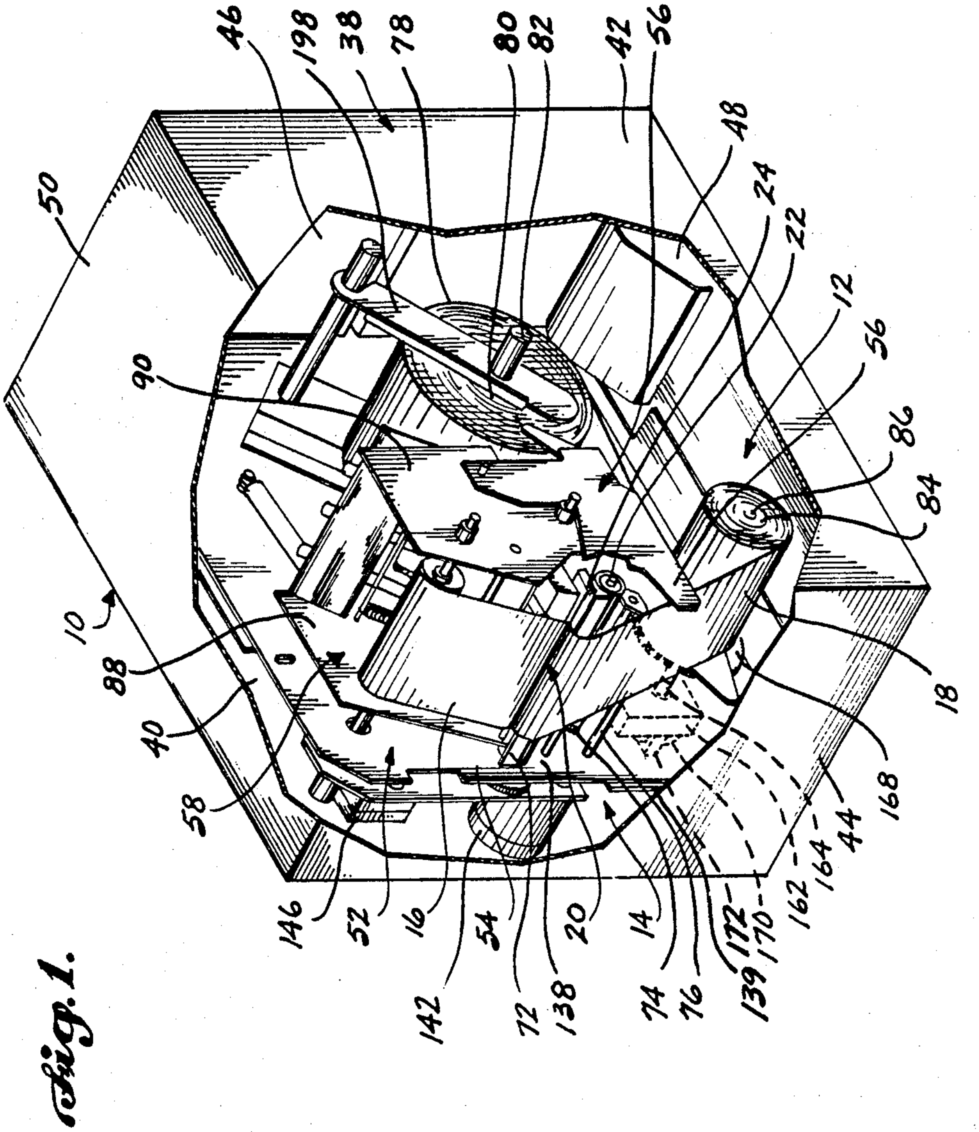
FIG. 1 is a pictorial view of a thermal transfer printer that includes thermal transfer ribbon and receiving paper tension control systems constructed in accordance with this invention.

While the disclosed method and apparatus for controlling tape advance along a feed path have numerous applications including, for example, film processing and projection systems, their use with thermal transfer technology is particularly desirable given the extremely thin nature of the thermal transfer ribbons involved. Referring now to FIG. 1, a thermal transfer printer 10 constructed in accordance with this invention is depicted. As shown, printer 10 is divided into a tape processing section 12 and a control section 14. As will be discussed in greater detail below, the tape processing section 12 is constructed to store and process both a thermal transfer ribbon 16 and a receiving paper 18. Processing section 12 effectuates a desired printing on the receiving paper 18 by passing both the ribbon 16 and paper 18 through a processing station 20. Station 20 includes an opposing roller 22 and print head 24 that contact the paper 18 and ribbon 16, respectively. Roller 22 controls the advance of ribbon 16 and paper 18 through station 20, while print head 24 causes the desired patterns of ink to be transferred from ribbon 16 to the receiving paper 18.

As will be discussed in greater detail below, control section 14 determines various aspects of processing section 12 operation. For example, the energization of print head 24 is controlled by control section 14. Control section 14 also regulates both the progress of ribbon 16 and paper 18 through processing station 20 and the manner in which these tapes are supplied to and drawn from processing station 20. The particular manner in which section 14 controls processing section 12 allows a desired tension in ribbon 16 and paper 18 to be maintained, substantially independent of variations in the advancement of the tapes through processing station 20.

Before discussing the construction and operation of printer 10 in greater detail, a brief review of the transfer dynamics of reel-stored tape is provided. As shown in FIG. 2A, a tape 26 is wound about a reel 28. The combined radius of tape 26 and reel 28 is designated $r_1$. Tape 26 also traverses a roller 30 having a radius $r_2$. Reel 28 is advanced independently of roller 30, which frictionally drives tape 26 past processing station 32.

In the arrangement shown in FIG. 2A, the circumference of the tape 26 wound on reel 28 greatly exceeds the circumference of roller 30. Thus, if reel 28 and roller 30 are each rotated counterclockwise one complete turn, more tape 26 will be removed from reel 28 than can be advanced by roller 30. More particularly, the length of tape advanced by roller 30 is $r_2/r_1$ times that which is advanced by reel 28. To equalize this difference in tape advance rate, the reel 28 must be rotated at an angular velocity $\omega_1$ that is $r_2/r_1$ times the angular velocity $\omega_2$ of roller 30.

Figure 2B:
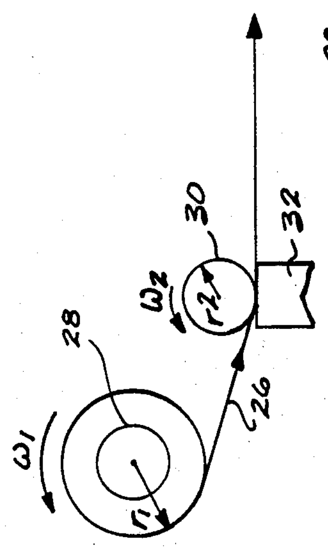
FIGS. 2A and 2B illustrate the change in tape volume stored on a reel as tape is transferred from the reel past a processing station.
Figure 2A:
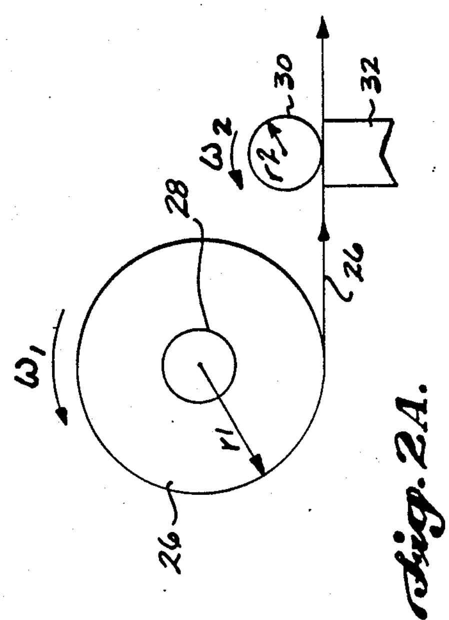

As shown in FIG. 2B, when tape 26 is removed from reel 28, the combined radius $r_1$ of the tape 26 and reel 28 decreases. Thus, if the tape advance rate produced by reel 28 and roller 30 is to be maintained equal, the angular velocity $\omega_1$ of reel 28 must be increased in accordance with the previously expressed relationship $\omega_2 r_2/r_1$. As more tape 26 is removed, at some point the combined radius $r_1$ may equal the radius $r_2$ of roller 30. When that happens, reel 28 and roller 30 will advance the same amount of tape 26 if their angular velocities $\omega_1$ and $\omega_2$ are equal. In the event that the combined radius $r_1$ of tape 26 and reel 28 becomes less than the radius $r_2$ or roller 30, the angular velocity $\omega_1$ of reel 28 must become greater than the angular velocity $\omega_2$ of roller 30. As will be readily appreciated, between these various transitional points, the operating characteristics of reel 28 and roller 30 must be continuously adjusted if a desired relationship between the tape 26 removed from reel 28 and advanced by roller 30 is to be maintained. If the proper compensation is not provided, the tension in the tape 26 between reel 28 and roller 30 may undergo substantial fluctuations. In addition, it should be noted that the same type of compensation is required if tape 26 is being loaded onto, rather than drawn off of, reel 28.

Figure 3B:
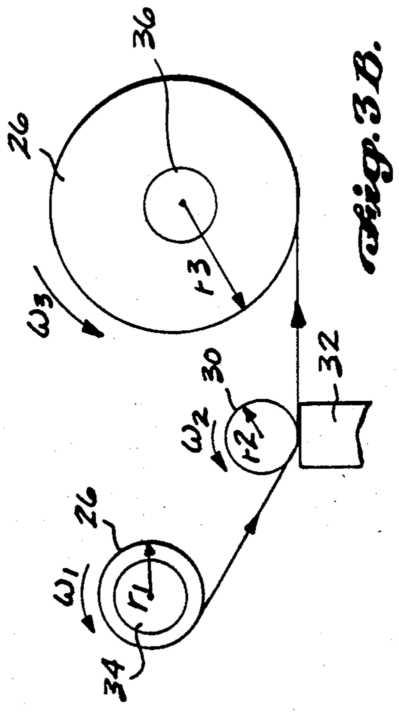
FIGS. 3A and 3B illustrate the change in tape volume stored on a pair of reels as the tape is transferred between the reels and past a processing station.
Figure 3A:
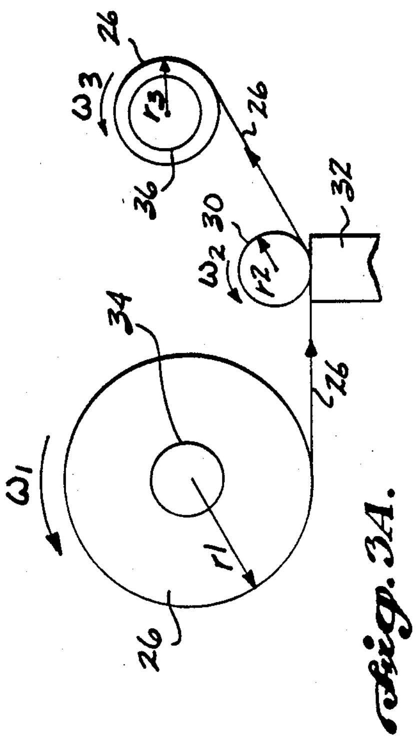

As indicated by FIGS. 3A and 3B, applications involving the storage of tape 26 upon reels both before and after processing effectively double the compensation required to maintain the consistent advance of tape 26. More particularly, as shown in FIG. 3A, tape 26 is initially wound upon a supply reel 34. The combined radius of tape 26 and reel 34 is designated $r_1$. The frictional engagement between roller 30, having a radius $r_2$, and processing station 32 controls the advance of tape 26 past processing station 32. From there, tape 26 is received by a take-up reel 36 having a combined tape 26 and reel 36 radius designated $r_3$. As tape 26 advances past processing station 32, the tape is transferred from supply reel 34 to take-up reel 36. Thus, the radii $r_1$ and $r_3$ continuously change, both with respect to each other and the radius $r_2$ of roller 30. To maintain uniform tape advance rates at reel 34, roller 30 and reel 36, the angular velocities of reels 34 and 36, $\omega_1$ and $\omega_3$, must remain equal to $\omega_2 r_2/r_1$ and $\omega_2 r_2/r_3$, respectively, as the radii $r_1$ and $r_3$ change. The failure to correctly compensate for the effect of these changing radii may result in substantial fluctuations in the tension of tape 26 between reels 34 and 36. Thus, feedback information concerning the status of tape 26 on a particular reel is necessary to maintain the desired tension in tape 26. Information about the status of the tape 26 upon a particular reel can be determined both from a measurement of the radius of the tape wound upon the reel and a comparison of the rotation of the reel corresponding to a particular rotation of roller 30. As will be discussed in greater detail below, a comparison of the angular rotation of roller 30 to the angular rotation of the reel to be controlled provides the preferred form of feedback.

As will be appreciated, tape 26 may be advanced past processing station 32 by devices other than roller 30. Regardless of the manner in which tape 26 is advanced past station 32, however, the functional relationships between the angular displacement of the reels and their combined tape-and-reel radii remain applicable.

Turning now to a more detailed description of an application in which feedback information is used to control the advance of two tapes along relatively independent feed paths, reference is had to FIG. 1. As shown, printer 10 includes a housing 38 that encompasses the tape processing and control sections 12 and 14, protecting them from physical damage by external sources. The housing 38 includes a control side panel 40 that provides access to the control section 14 of printer 10. Similarly, a tape-processing side panel 42 provides access to the tape processing section 12. Front and rear panels 44 and 46 provide convenient mounting panels for power supply components, user input controls, and system displays. Base and cover panels 48 and 50 complete the exterior portion of housing 38.

An internal support structure 52 of housing 38 is included to support the various components of printer 10 discussed below. The structure 52 primarily includes an isolation panel 54 that extends between front panel 44, rear panels 46, base panel 48, and cover panel 50. Isolation panel 54 is the primary support element for the components mounted in housing 38. As will be appreciated, isolation panel 54 divides printer 10 into the tape processing and control sections 12 and 14 noted above.

As shown in FIG. 1, the tape processing section 12 of printer 10 includes a paper feed and roller assembly 56 secured to isolation panel 54. A ribbon feed and print head assembly 58 is, in turn, pivotally secured to assembly 56. The ribbon feed and print head assembly 58 is shown in FIG. 1, in its closed position, with print head 24 residing opposite roller 22 and spaced therefrom by ribbon 16 and paper 18.

Figure 4:
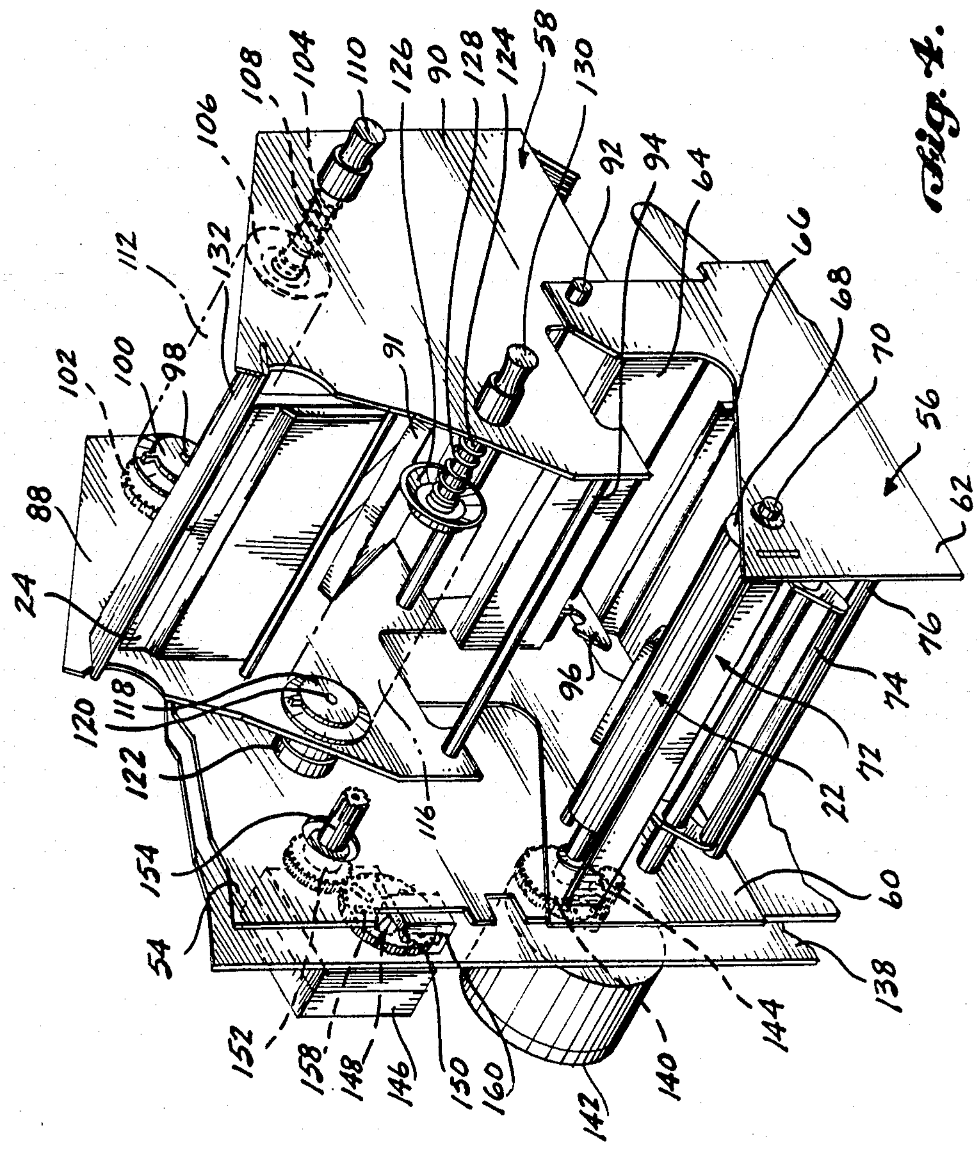
FIG. 4 is a more detailed view of a paper module, ribbon module, and motor and encoder module included in the thermal printer illustrated in FIG. 1.

Referring now to FIG. 4, the ribbon feed and print head assembly 58 is shown in an open position with respect to the paper feed and roller assembly 56. As shown, paper feed and roller assembly 56 comprises a first end plate 60 secured to the processing section side of isolation panel 54. A second end plate 62 lies substantially parallel to the first end plate and is spaced therefrom by a support bar 64. The remaining components of paper feed and roller assembly 56 are arranged substantially perpendicular to, and supported on each end by, end plates 60 and 62.

More particularly, an incoming paper feed assembly 66 is provided between end plates 60 and 62 at the lower, rearward portion of the paper feed and roller assembly 56. Incoming feed assembly 66 guides the receiving paper 18 to the roller 22, which is supported at each end by end plates 60 and 62. The roller 22, which advances ribbon 16 and paper 18 past print head 24, comprises a relatively hard, resilient, cylindrical support pad 68, coaxially secured to a roller shaft 70. The end of shaft 70 projecting through end plate 60 and isolation panel 54 is arranged to allow rotational motion of roller 22 to be established in the manner described in greater detail below.

Also included between end plates 60 and 62 of the paper feed and roller assembly 56, is a relatively thin strip bar 72 supported slightly forward of roller 22. Strip bar 72 is used in conjunction with paper 18 that comprises a label material releasably adhered to a backing material, to automatically remove the label material from its backing. A spring-loaded tensioning device 74 is disposed between end plates 60 and 62 slightly below and rearwardly of strip bar 72 to develop uniform tension within paper 18 as it traverses strip bar 72. Finally, a pivotable guide roller 76 is supported between the bottom edges of end plate 60 and 62 to guide paper 18 as it exits assembly 56.

Referring to FIGS. 1 and 4, the feed of receiving paper 18 through printer 10 will now be sequentially described. A roll 78 of receiving paper 18 is wound upon a supply reel 80 that is supported by a shaft 82 projecting substantially perpendicularly from isolation panel 54 rearward of the paper feed and roller assembly 56. The exposed end of the receiving paper 18 on roll 78 is fed through the incoming feed assembly 66 of the paper feed and roller assembly 56. Feed assembly 66 guides the paper both forward and upward into a position of contacting alignment with the upper surface of roller support pad 68.

If the printed receiving paper 18 is to be used directly after printing, it may be fed out of printer 10 through a slot provided in the front panel 44 immediately after traversing roller 22. In such instances, roller support pad 68 defines the end of the paper feed path. In other applications, receiving paper 18 is more conveniently stored on a reel after printing. For example, in a preferred application, receiving paper 18 includes a label material that is removably adhered to a backing material. With the label material precut into labels of select sizes and shapes, it may be desirable to effect removal of the printed labels from the backing material immediately after printing. The printed labels can then be individually fed through the slot in the front panel 44, while the backing material is stored on a reel within printer 10 for subsequent disposal. To accomplish these functions, additional components are included along an extended portion of the paper feed path.

The first such component traversed by paper 18 after leaving roller 22 is strip bar 72, which causes the paper feed path to turn abruptly downward. As will be appreciated, if paper 18 is a combined label and backing material, its passage over the sharp corner defined by strip bar 72 separates the label from the backing material, causing the label to project out through the slot in the front panel 44 of printer 10 while the backing continues downward.

From strip bar 72, the backing material or printed receiving paper 18 to be stored, continues over spring-loaded tensioning device 74 constructed to maintain uniform tension in paper 18 as it traverses strip bar 72. The paper 18 then progresses over guide roller 76, which directs the paper to a take-up reel 84 rotatably mounted upon a take-up shaft 86 projecting substantially perpendicularly from the isolation panel 54 below paper feed and roller assembly 56. Paper 18 is advanced along this completed path by driving the roller shaft 70 and paper take-up shaft 86 in the controlled manner described in greater detail below. Before discussing paper feed path control, however, the ribbon feed and print head assembly 58 will be discussed in greater detail.

As noted previously, FIG. 4 depicts ribbon feed and print head assembly 58 in an open position with respect to paper feed and roller assembly 56. In this position, convenient access to both assemblies 56 and 58 is had for loading ribbon 16 and paper 18 as well as assembly maintenance. The ribbon feed and print head assembly 58 includes a first end plate 88 disposed substantially parallel to, and only slightly spaced apart from, isolation panel 54. A second end plate 90 lies substantially parallel to end plate 88 and is separated therefrom by a support bar 91. Between end plates 88 and 90, a pivot rod 92 is provided upon which assembly 58 pivots with respect to the stationary paper feed and roller assembly 56. A second spacer rod 94 provides support between lower points of end plates 88 and 90 and can be lockingly engaged with a hooking mechanism 96 supported between end plates 60 and 62 of the paper feed and roller assembly 56.

End plates 88 and 90, along with support bar 91 and rod 94, provide a support structure for the remaining components of the ribbon feed and print head assembly 58. As will be appreciated, these components define the ribbon feed path through printer 10 and effectuate the desired transfer of ink from ribbon 16 to paper 18. The first such component to be considered is the electrically actuated, thermally responsive print head 24, disposed between end plates 88 and 90 such that, with ribbon feed and print head assembly 58 pivoted into its closed position, print head 24 is substantially tangent to and adjacent roller 22.

Disposed above print head 24 and supported by end plate 88 is a shaft 98 having a tabbed reel-engaging hub 100 secured thereto and projecting into assembly 58 from end plate 88. A transfer gear 102 is secured to the portion of shaft 98 projecting outwardly from end plate 88. Axially aligned with shaft 98 and projecting through the other end plate 90 is an axially slidable shaft 104. The end of shaft 104 projecting inwardly from end plate 90 is provided with an untabbed reel-engaging hub 106 that is biased by cylindrical spring 108 toward the tabbed hub 100. A fixture and knob assembly 110 located on the opposite side of end plate 90 maintains shaft 104 in slidable support with respect to end plate 90 and allows the untabbed hub 106 to be retracted against spring 108, increasing the separation of hubs 100 and 106. In this manner, a ribbon take-up reel 112 designed to receive ribbon 16 can be securely loaded between hubs 100 and 106.

A similar arrangement is provided for loading a roll of ribbon 16, stored on supply reel 116, into the ribbon feed and print head assembly 58. As shown, a tabbed reel-engaging hub 118 is mounted on the inwardly directed end of a rotatable shaft 120 disposed through end plate 88 below print head 24. A slip clutch assembly 122, secured to the other end of shaft 120, resists rotation of shaft 120 caused by the withdrawal of ribbon 16 from the roll.

An axially slidable shaft 124 is supported in part by end plate 90 in alignment with shaft 120. Shaft 124 has an untabbed reel-engaging hub 126 secured to its inwardly depending end. A cylindrical spring 128, located coaxially on shaft 124 between hub 126 and end plate 90, biases hub 126 toward the tabbed reel-engaging hub 118. A fixture and knob assembly 130, provided on the other end of slidable shaft 124, supports shaft 124 and allows the untabbed hub 126 to be retracted with respect to the tabbed core hub 118. In this manner, ribbon supply reel 116 can be easily loaded into the ribbon feed and print head assembly 58. The final component of the ribbon feed path is a ribbon guide bar 132 aligned substantially perpendicular to the face of print head 24.

Figure 5:
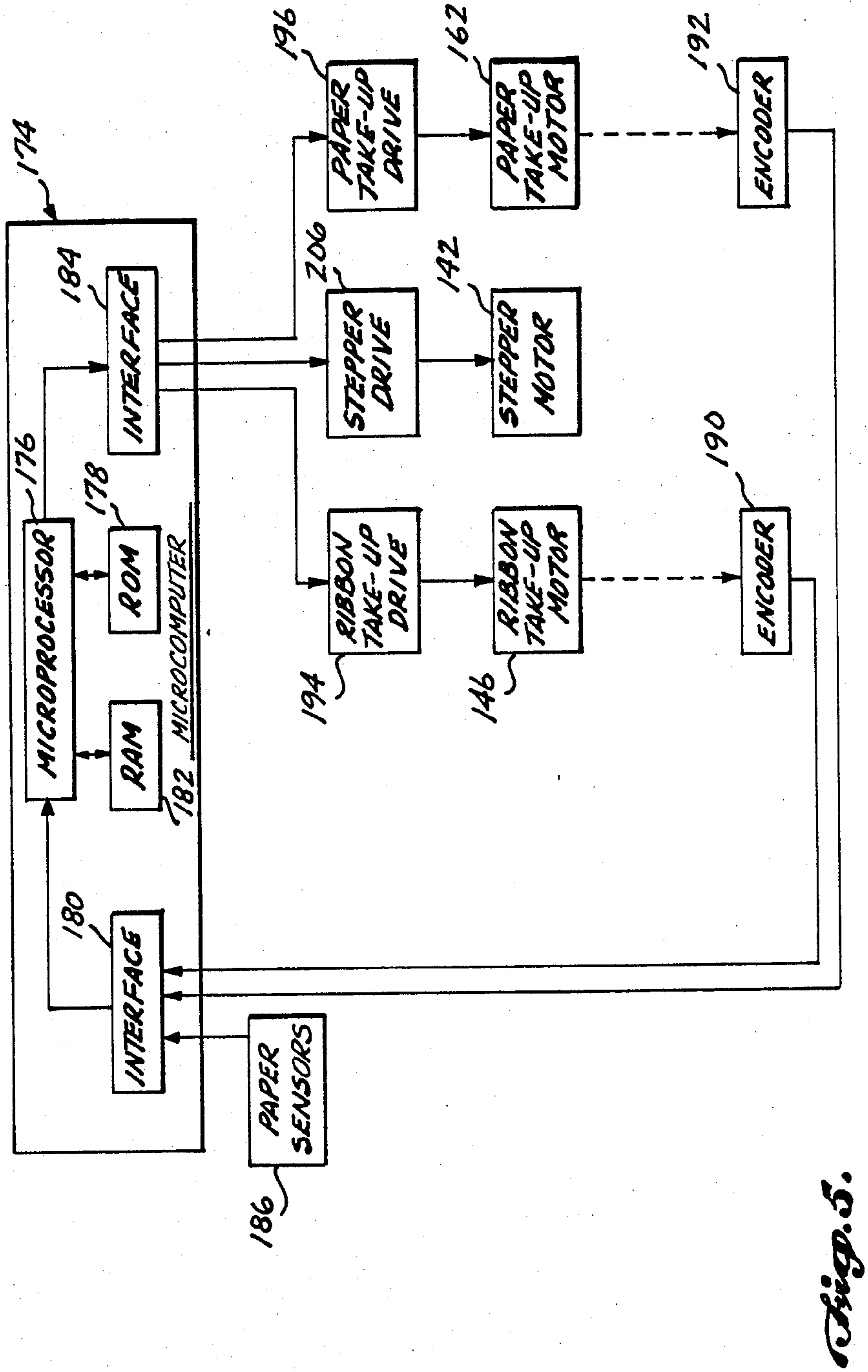
FIG. 5 is a block diagram illustrating the functional interrelation of the various components illustrated in the thermal transfer printer of FIG. 1.
Figure 6:
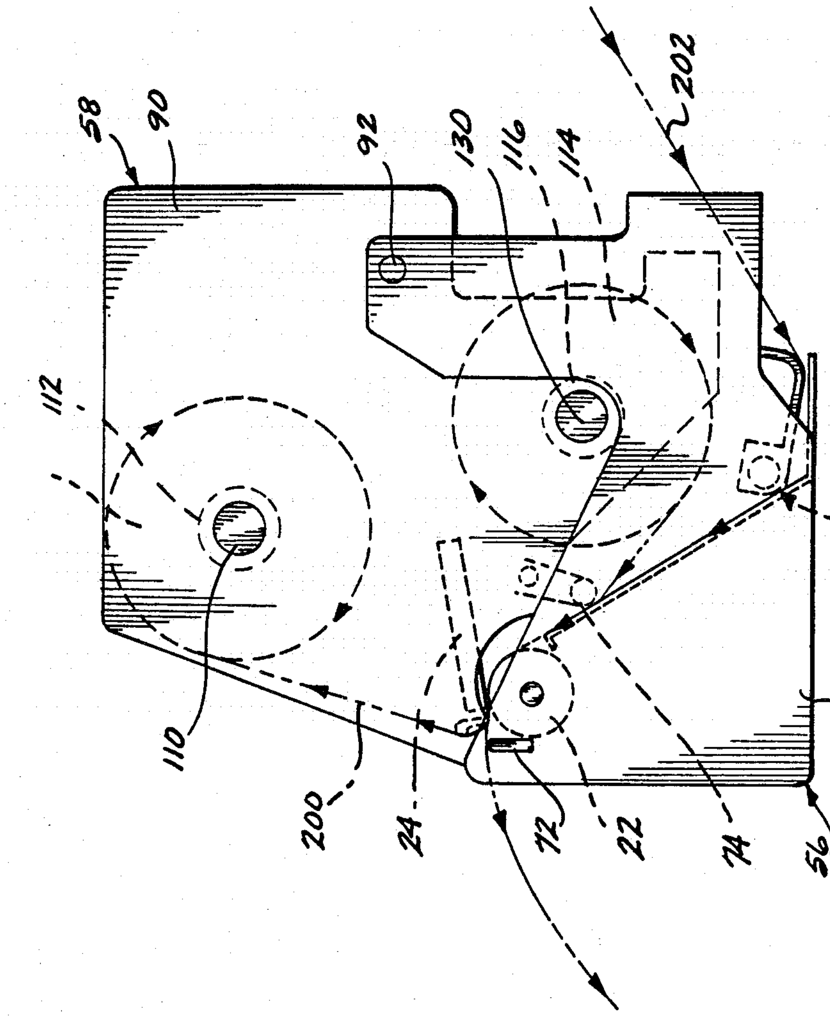
FIG. 6 is a side view of the ribbon and paper modules illustrated in FIG. 4, showing the ribbon and paper advance paths through the modules; and, FIG. 7 is a block diagram illustrating the functional interrelation of various components included in an alternative embodiment of a thermal transfer printer.

Turning now to the components of printer 10 included in the control section 14, reference is had to FIGS. 4, 5, and 6. As shown in FIG. 4, a motor mounting plate 138 is supported in spaced-apart relationship with respect to isolation panel 54. As will be appreciated, mounting plate 138 conveniently allows the ribbon and paper drive components discussed below to be secured within the control section 14 of printer 10.

The first such component to be discussed is a stepper motor 142. As shown in FIG. 4, a roller drive gear 140 is provided on the portion of roller shaft 70 projecting between isolation panel 54 and mounting plate 138. The stepper motor 142 is secured to the side of mounting plate 138 opposite isolation panel 54 and has a splined shaft 144 constructed for engaging the teeth of gear 140. The position of stepper motor 142 with respect to mounting plate 138 is such that shaft 144 projects through an opening in mounting plate 138 and cooperatively engages the roller drive gear 140.

Referring to stepper motor 142 in greater detail, it will be appreciated that stepper motor 142 can be selected from a variety of stepper motor types including, for example, multistator stack types. In addition, various excitation modes including, for example, single phase excitation, can be employed. Regardless of its construction, however, stepper motor 142 is designed to produce a predetermined angular rotation of shaft 144 with each pulse of electrical energy that it receives. Thus, the relative position of shaft 144 can be precisely determined if the number of control pulses input to stepper motor 142 are known. Once stopped, stepper motor 142 maintains the position of shaft 144 until the holding torque of the motor, determined from the motor's characteristic curves, is exceeded.

As shown in FIGS. 1 and 4, the control section 14 of printer 10 also includes a DC ribbon take-up motor 146. The motor field of motor 146 may be shunt-wound, series-wound, or compound-wound. Alternatively, permanent magnets may be employed to establish the excitation field for the motor. Regardless of its basic constructional details, however, DC motor 146 produces a torque that is proportional to the electrical current supplied to the motor.

The DC ribbon take-up motor 146 is secured to motor mounting plate 138 at a predetermined location with respect to the rotatable shaft 98, defined when the ribbon feed and print head assembly 58 is in its closed position. The shaft 148 of the take-up motor 146 projects through mounting plate 138 and is terminated in a drive gear 150. A reduction gear 152, provided on a secondary shaft 154 that is rotatably supported by bearing surfaces in the mounting plate 138 and isolation panel 54, cooperatively engages drive gear 150. A splined end of secondary shaft 154 projects from isolation panel 54 and engages the ribbon take-up transfer gear 102. Thus, as will be appreciated, rotation of take-up motor 146 is transferable through shaft 148, drive gear 150, reduction gear 152, secondary shaft 154 and transfer gear 102, thereby turning the tabbed reel-engaging hub 100 that drives ribbon take-up reel 112.

The rotation of motor 146 and, hence, take-up reel 112 is monitored in the following manner. A plurality of equally spaced-apart perforations 158 are provided through the drive gear 150 along a path concentrically aligned with gear 150 but having a smaller circumference. An optical switch 160 encompasses a portion of the periphery of drive gear 150 and produces a signal having two levels corresponding to light being either blocked or transmitted by the gear 150. Thus, the number of transitions exhibited by switch 160 indicates the magnitude of the rotation produced by motor 146.

A DC paper take-up motor 162, having substantially the same operating characteristics as the DC ribbon take-up motor 146 described above, is secured to a lower motor mounting plate 139. As shown in FIG. 1, the shaft 164 of motor 162 projects through isolation panel 54. The splined, projecting end of shaft 164 cooperatively engages the teeth of a relatively large drive gear 168 coaxially secured to the rotating paper take-up shaft 86. In this manner, the controllable torque developed by motor 162 is transferred to the paper take-up reel 84 disposed on take-up shaft 86.

To monitor the rotation of motor 162 and take-up shaft 86, an optical encoder hub 170, having a plurality of spaced-apart perforations (not shown), is secured to an end of shaft 164 that projects from the motor 162, opposite mounting plate 138. An optical switch 172 encompasses a portion of the perforated faces of encoder hub 170 and produces a two-level signal that corresponds to light either being blocked or transmitted by hub 170. Thus, the number of transitions in the signal produced by switch 172, when appropriately compensated, indicates the angular rotation of motor 162, motor shaft 164, and take-up drive shaft 86.

Before turning to a discussion of the manner in which the above described components cooperate to provide uniform tension in the ribbon 16 and paper 18 advanced through processing station 20, the control circuitry that effects that cooperation is noted. As shown in FIG. 5, a microcomputer 174 comprises the primary controlling element of printer 10. Microcomputer 174 includes a microprocessor 176 for executing a plurality of predetermined instructions stored in read only memory (ROM) 178. Pursuant to these instructions, microprocessor 176 receives input information via interface 180, stores it in random access memory (RAM) 182, and then analyzes it to produce motor control signals output via interface 184.

The input signals analyzed by microprocessor 176 have a variety of sources including paper position sensors 186. Sensors 186 are conveniently optoelectronic devices that produce two-level output signals corresponding to the presence or absence of opaque material in a sensor detection path. Paper position sensors 186 may be employed, for example, to indicate the presence of paper 18 adjacent to strip bar 72.

Angular distance encoders 190 and 192 also provide input information to microprocessor 176 regarding the status of printer 10 operation. More particularly, encoders 190 and 192 indicate the operating conditions of the ribbon take-up motor 146 and reel 112 and paper take-up motor 162 and reel 84, respectively. Encoder 190 comprises the drive gear 150 and optical switch 160 described above. As will be appreciated, the output of encoder 190 is a two level signal exhibiting a number of transitions that are directly proportional to the angular distance traversed by the ribbon take-up reel 112. Similarly, angular distance encoder 192 comprises encoder hub 170 and optical switch 172, which cooperate to produce a signal whose transitions correspond in number to the angular rotation of the paper take-up reel 84. The interface 180 supplying microprocessor 176 with this input information includes an analog-to-digital (A/D) converter that provides a digitized representation of the input signals to microprocessor 176 upon demand.

While the use of encoders 190 and 192 that respond to angular distance changes is preferred, encoders 190 and 192 may alternatively respond to the angular velocity of drive gear 150 and encoder hub 170, respectively. A disadvantage of monitoring angular velocity is that a comparison between the number of control pulses applied to stepper motor 142 and the angular velocity of the ribbon or paper at the periphery of the corresponding take-up reel is a function of both the changing radius of the ribbon or paper stored on the reel and changes in the velocity of the corresponding take-up motor shaft. When the comparison is between the stepper motor control pulses and the angular displacement of the ribbon or paper on the corresponding take-up reel, however, only changes in ribbon or paper radius on the reel affect the comparison. Thus, variations in the speed of the motor are advantageously eliminated from the comparison, allowing changes in the volume of ribbon or paper stored on the reel to be more easily determined.

Once microprocessor 176 has analyzed the input information received via interface 180, to produce uniform ribbon 16 and paper 18 tension in the manner described in greater detail below, it responds by producing output control signals. These digitized control signals are converted to analog motor drive signals by two successive approximation digital-to-analog (D/A) converters included in interface 184. A first of these motor drive signals is provided to a ribbon take-up motor drive 194 that includes a pulse width modulator. The output of drive 194, supplied to motor 146, is a high-voltage pulse train having a DC component that is proportional to the drive signal received. Because the torque of the ribbon take-up motor 146 is proportional to the current received, motor drive 194 thus allows the torque of motor 146 to be closely controlled.

A second motor drive signal is supplied by interface 184 to a paper take-up motor drive 196. Drive 196 also includes a pulse width modulator to energize the paper take-up motor 162 in a manner that allows the torque of motor 162 to be controlled. Finally, a stepper drive 198 receives drive signals from interface 184 and employs a half-step, dual-voltage, unipolar scheme to control the stepping operation of motor 142.

Having reviewed the basic structure of printer 10 and its operational organization, a more detailed discussion of the manner in which the tension of ribbon 16 and paper 18 is controlled is provided. Ribbon 16 and paper 18 are loaded into printer 10 as shown in FIG. 1. A roll 78 of receiving paper 18, wound on paper supply reel 80, is rotatably positioned on the paper supply shaft 82. A retaining device 198 engages the roll 78 to maintain the desired orientation of paper 18 as it approaches the paper feed and roller assembly 56, as well as to provide some resistance to the rotation of paper roll 78. Paper 18 is then fed through the paper feed and roller assembly 56 and started upon the take-up reel 84.

Ribbon 16 is loaded into printer 10 by pivoting the ribbon feed and print head assembly 58 upward as shown in FIG. 4. The ribbon supply reel 116 is engaged on one end by the tabbed hub 118, while fixture and knob assembly 130 is used to bias the untabbed hub 126 into the other end of supply reel 116. The ribbon take-up reel 112 is similarly disposed between tabbed hub 100 and untabbed hub 106. Ribbon 16 is then drawn from supply reel 116, over print head 24, and onto take-up reel 112. With ribbon 16 loaded, the ribbon feed and print head assembly 58 is pivoted downward into its closed position with respect to paper feed and roller assembly 56.

As will be appreciated, with printer 10 loaded in the foregoing manner, distinct ribbon feed and paper feed paths 200 and 202, respectively, are formed. A substantially common portion of each feed path 200 and 202 is defined between roller 22 and print head 24. As noted previously, it is along this common portion of feed paths 200 and 202 that print head 24 initiates the transfer of ink from ribbon 16 to paper 18.

The speed at which ribbon 16 and paper 18 advance past print head 24 is controlled by the frictional engagement of roller support pad 68 with the paper 18 and ribbon 16. As will be appreciated from the discussion of the various control circuit components, the advance rate of ribbon 16 and paper 18 through processing station 20 is thus dependent upon the rate at which energizing pulses are provided by stepper drive 206 to stepper motor 142. The number of such pulses supplied to stepper motor 142 defines a stepper drive pulse count that is stored by microprocessor 176 in RAM 182. This pulse count is proportional to the angular distance traversed by roller 22 and, hence, the motion of ribbon 16 and paper 18 through processing station 20. Microprocessor 176 also controls the output pulse rate of stepper drive 206 to ensure that the transfer of ink from ribbon 16 is effected upon the desired portion of receiving paper 18.

Considering first the manner in which tension is maintained in the portion of ribbon 16 extending between roller 22 and take-up reel 112, it will be appreciated that the tension in ribbon 16 is a function of the torque applied to reel 112 by motor 146 divided by the operating radius of the ribbon 16 wound upon reel 112. As will be appreciated from the earlier discussion of tape transfer dynamics, the operating radius of the ribbon 16 upon reel 112 varies continuously with rotation of reel 112. Therefore, if ribbon tension is to be maintained, microprocessor 176 must compensate for the changing operating radius by adjusting the drive signals provided by ribbon take-up drive 194 to take-up motor 146. To accomplish this, microprocessor 176 monitors both the ribbon take-up encoder 190 output and the stepper drive pulse count stored in RAM 182. By comparing these two signals over a corresponding interval of time, the operating radius of the ribbon 16 wound upon reel 112 can effectively be determined. More particularly, when a relatively small volume of ribbon 16 is wound upon reel 112, the output of take-up encoder 190 corresponding to a given stepper drive pulse count will be relatively high. As additional ribbon is wound upon take-up reel 112, however, the output of take-up encoder 190 becomes progressively smaller in comparison to the number of driving pulses applied to the stepper motor 142. Thus, a comparison of these two indicia provides an accurate indication of the changing operating radius of ribbon 16 wound upon reel 112. As will be appreciated, although not employed in the preferred arrangement, a comparison of the angular velocities, or operating radii, of roller 22 and take-up reel 112 may be similarly employed to provide the desired indication of the changing operating radius of the ribbon 16 wound upon reel 112.

Microprocessor 176 stores the comparison of ribbon take-up encoder 190 output and the stepper drive pulse count, which, for example, may be the ratio of the encoder 190 output over the stepper drive pulse count, in RAM 182. To determine the adjustment in ribbon take-up motor 146 torque required to maintain uniform ribbon tension, microprocessor 176 accesses a function table stored in ROM 178. This table comprises empirically derived data indicating the take-up motor torques required for an expected range of stored comparisons of encoder 190 output and stepper drive pulse count. As will be appreciated, the particular manner in which the requisite motor torque varies with the stored comparison is influenced by a variety of factors. Included among these factors is the amount of angular rotation of stepper motor 142 produced by an input drive pulse, the gearing employed between stepper motor 142 and roller 22, the gearing employed between ribbon take-up motor 146 and take-up hub 100, and the encoding rate of encoder 190.

Tension in ribbon 16 between roller 22 and the supply reel 116 is maintained by a mechanical slip clutch assembly 122 cooperatively connected to tabbed reel-engaging hub 100 by shaft 120. As will be appreciated, slip clutch assembly 122 provides a spring-biased, frictional resistance to rotation of the supply reel 116 in a direction that would advance ribbon 16 past print head 24 and toward take-up reel 112. In this manner, slip clutch assembly 122 prevents supply reel 116 overtravel, thereby maintaining some tension in ribbon 16. While a microprocessor-controlled arrangement similar to that discussed above in conjunction with the control of ribbon tension between roller 22 and take-up reel 112 can be used in place of slip clutch assembly 122, as discussed in greater detail below, it has been found that slip clutch assembly 122 economically provides adequate uniformity of tension in the ribbon 16 between supply reel 116 and roller 22.

Tension in the paper 18 disposed along paper feed path 202 is controlled in a manner similar to that of ribbon 16. More particularly, microprocessor 176 compares the output of paper take-up encoder 192 with the stepper drive pulse count over a corresponding interval of time. Because the output of paper take-up encoder 192 varies inversely as a function of the operating radius of paper 18 wound upon paper take-up reel 84, the comparison of encoder output and drive pulse count yields an indication of the current operating radius of paper 18 wound upon paper take-up reel 84. Microprocessor 176 stores this comparison in RAM 182 and then accesses a second function table stored in ROM 178 to determine the adjustment in take-up drive 196 current and, hence, take-up motor 162 output torque, necessary to maintain the desired tension in paper 18. As will be appreciated, this second function table includes empirically derived data correlating an expected range of signal comparisons with the appropriate drive current, or motor torque, adjustment response. The difference in, for example, the gearing involved in the ribbon feed path and paper feed path drive elements necessitates the use of the second function table. As with control of the ribbon feed path 200, the overall effect of microprocessor 176 control of the paper feed path 202 is that the torque applied by take-up motor 162 to take-up reel 84 is varied indirectly with the operating radius of the paper 16 determined to be upon reel 84.

Tension in the receiving paper 18 between roller 22 and supply reel 80 is maintained by a mechanical tensioning device 198. Device 198 contacts a lateral surface of the paper 18 supply roll 78, applying a force that resists rotation of supply reel 80 as paper 18 is drawn therefrom. In this manner, some tension is always maintained in the portion of paper 18 extending toward roller 22. As will be discussed in greater detail below, this arrangement can be replaced by a microprocessor-controlled feedback arrangement similar to that maintaining tension in the other portion of the paper feed path 202. In the preferred arrangement, however, mechanical tension device 198 is employed for its simplicity and ability to maintain adequate tension within paper 18 between roller 22 and supply reel 80.

In addition to the control functions described above, microprocessor 176 is responsible for ensuring that the desired printing occurs upon receiving paper 18. To accomplish this, microprocessor 176 coordinates a controlled output sequence from stepper drive 206 with a controlled energization of print head 24. In this manner, a particular transfer of ink from ribbon 16 onto paper 18 is effected at a particular point on paper 18.

As part of a diagnostics check routine, microprocessor 176 additionally processes information from the paper position sensors 186 and encoders 190 and 192 to indicate the status of ribbon 16 and paper 18 along feed paths 200 and 202. More particularly, microprocessor 176 monitors the input information received from sensors 186 to identify a number of conditions including, for example, the presence of paper 18 adjacent to strip bar 72. In addition, the outputs of encoders 190 and 192 are monitored to determine whether they exceed a predetermined frequency indicative of either a broken ribbon 16 or paper 18 or the complete absence of ribbon 16 or paper 18 along the feed paths. If, on the other hand, the output received from encoder 190 or 192 is zero, while drive signals are output to motors 146 and 162, an indication may be produced that take-up reel 84 or 112 is jammed. In addition to producing operator display signals, microprocessor 176 may respond to the foregoing conditions by discontinuing the output of drive signals from the ribbon take-up, paper take-up, and stepper drives 192, 194, and 206, respectively. This reduces the likelihood of ribbon 16 and paper 18 being wasted as well as the possibility of damage to the elements defining feed paths 200 and 202.

Figure 7:
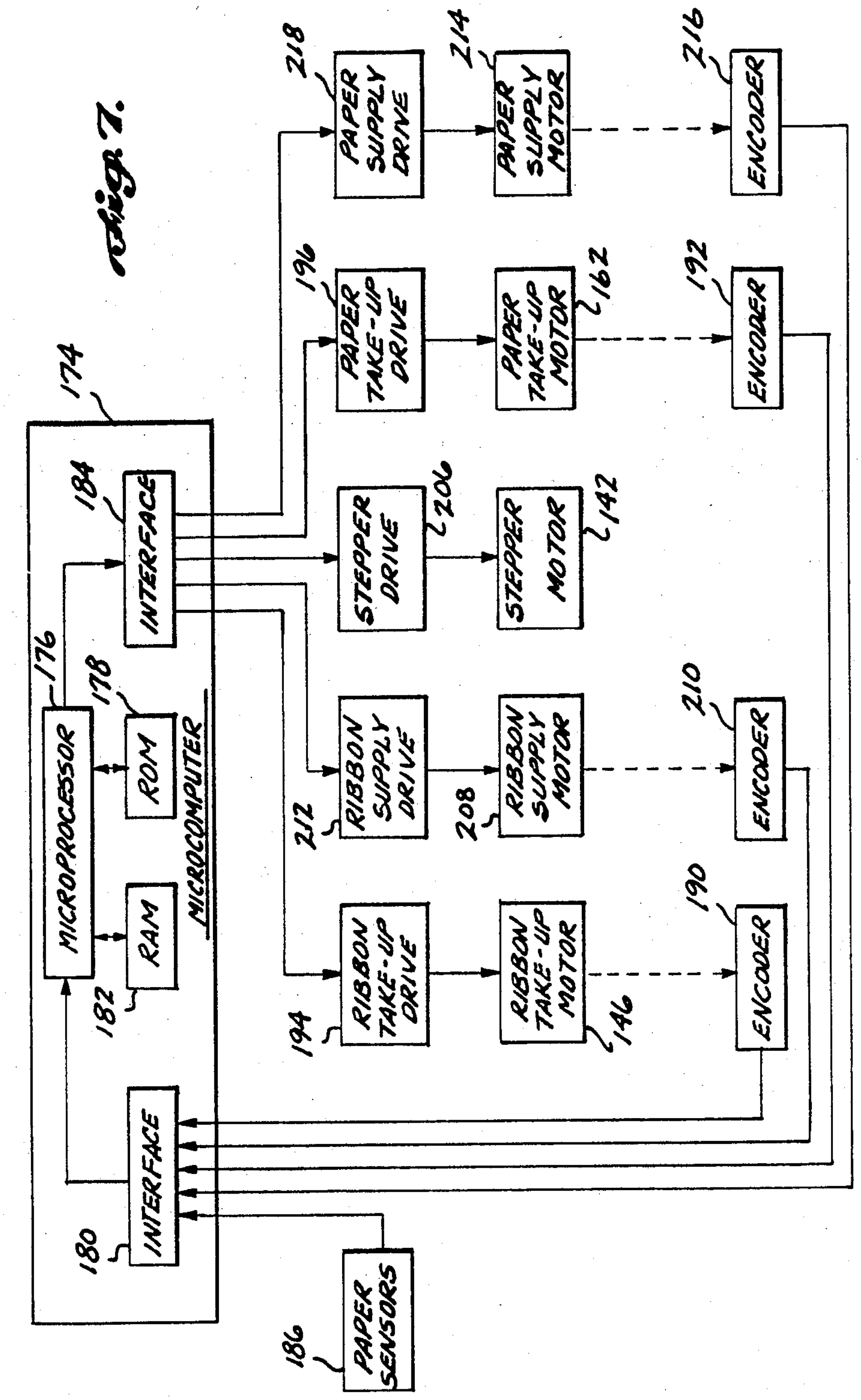

Referring now to FIG. 7, a block diagram of a system in which microprocessor 176 controls tension throughout the ribbon and paper feed paths 200 and 202 is shown. As will be appreciated, the depicted arrangement is the same as that shown in FIG. 5 with the addition of feedback elements used to control the operation of the ribbon and paper supply reels 116 and 80. For that reason, only the operation of these additional elements is described in conjunction with FIG. 7.

A ribbon supply motor 208 is employed to control the rotation of ribbon supply reel 116. Typically, ribbon supply motor 208 is a DC torque motor capable of operating under prolonged stall torques when driven against its field. More particularly, by controlling the energization of ribbon supply motor 208, a resistive torque applied by motor 208 to reel 116 as ribbon 16 is drawn therefrom can be varied.

Because the tension induced in ribbon 16 is a function both of motor 208 torque and the operating radius of ribbon 16 on reel 116, microprocessor 176 must compensate for the variation in the operating radius experienced as ribbon 16 is transferred from reel 116 to reel 112. As with the feedback-controlled arrangements discussed above, an optical encoder 210 provides microprocessor 176 with information regarding the angular distance traversed by reel 116. Microprocessor 176 compares this information with the stepper motor pulse count stored in RAM 182 to produce an indication of the operating radius of ribbon 16 on reel 116. Microprocessor 176 then accesses a third function table stored in ROM 178. The third function table comprises empirically derived data indicating the microprocessor response required to maintain ribbon tension as a function of the compared values of the encoder 210 output and stepper drive pulse count. After having determined the proper response, microprocessor 176 supplies an output drive signal to a ribbon supply motor drive 212 via interface 184. As with the other DC motor drives, supply drive 212 includes a pulse-width modulator whose output is a high voltage pulse train having a DC component that is proportional to the control signal received from interface 184.

A DC paper supply torque motor 214, constructed similar to the ribbon supply motor 208 described above, is employed to control the rotation of the paper supply reel 80. More particularly, motor 214 applies a resistive torque to reel 80 as paper 18 is removed from reel 80 by roller 22. The magnitude of the torque applied by motor 214 is adjusted as a function of the operating radius of paper 18 on reel 80 in substantially the same manner as was discussed with reference to ribbon supply motor 208. More particularly, an optical encoder 216 produces a feedback signal proportional to the angular distance traversed by paper supply reel 80, and provides that information to microprocessor 176. Microprocessor 176 compares the information from encoder 216 with the stepper drive pulse count stored in RAM 182 to determine the adjustment in the drive signal applied to motor 214 required to alter the torque for uniform paper tension. Microprocessor 176 makes the appropriate drive signal selection with reference to a fourth function table stored in ROM 178. The data stored in the fourth function table is empirically determined and indicates the drive signal as a function of the comparison between encoder 216 output and the drive pulse count. The drive signal selected is appropriately conditioned at interface 184 where it is transferred to a paper supply motor drive 218. Supply drive 218 includes a pulse width-modulator whose output is a high pulse train having a DC component proportional to the drive signal received from interface 184. In this manner, the resistive torque applied by motor 214 to the paper supply reel 80 is varied inversely with the operating radius of paper 18 upon reel 80.

Those skilled in the art will recognize that the embodiments of the invention disclosed herein are exemplary in nature and that various changes can be made therein without departing from the scope and the spirit of the invention. In this regard, although not preferred, it will be appreciated that the thermal ribbon and receiving paper can be provided on a common supply reel for separation and transfer to independent take-up reels after exiting the processing station. Independent control of these three reels, or simply the two take-up reels, could then be employed. Further, it will be recognized that the disclosed tensioning arrangement could be employed in conjunction with reversible direction tape transfer systems. Further, a multitude of different gearing arrangements and angular distance indicia sensing points can be employed. Because of the above and other variations and modifications that will occur to those skilled in the art, the following claims should not be limited to the embodiments illustrated and discussed herein.

The embodiments of the invention in which an exclusive property or privilege is claimed are defined as follows:

1. An apparatus for controlling the tension in a tape that is located in part upon a reel and that extends to tape advancement means, the tape advancement means being for cooperatively engaging a portion of said tape and producing a change in the position of said portion of said tape with respect to said reel, said apparatus comprising:

a tape advancement indicator for producing a reference signal representative of any change in position of said portion of said tape produced by said tape advancement means;

reel control means for applying an adjustable torque to said reel;

a reel control indicator for producing a feedback signal representative of any change in position of said reel resulting from said adjustable torque applied to said reel; and processing means for producing a control signal in response to said reference signal and said feedback signal, said control signal being provided to said reel control means to adjust said torque sufficiently to produce the desired tension in said tape.

2. The apparatus of claim 1, wherein said reel control means comprises an electric motor coupled to said reel and said control signal produced by said processing means is an electric current, said torque produced by said motor being proportional to said current.

3. The apparatus of claim 2, wherein said reel control indicator comprises an optical encoder.

4. The apparatus of claim 3, wherein said tape advancement means comprises:

a roller for contacting said portion of said tape; and a roller motor, coupled to said roller, for producing motion of said roller, said roller transferring said motion to said portion of said tape.

5. The apparatus of claim 1, wherein said reel control indicator comprises an optical encoder.

6. the apparatus of claim 1, wherein said tape advancement means comprises:

a roller for contacting said portion of said tape; and a roller motor, coupled to said roller, for producing motion of said roller, said roller transferring said motion to said portion of said tape.

7. The apparatus of claim 1, wherein said tape extends between a supply reel and a take-up reel, said tape advancement means being constructed for advancing said tape from said supply reel toward said take-up reel.

8. The apparatus of claim 7, wherein said tape advancement means comprises:

a roller for contacting said portion of said tape; and a roller motor, coupled to said roller, for producing motion of said roller, said roller advancing said tape between said supply reel and said take-up reel.

9. The apparatus of claim 7, wherein said reel control means comprises supply reel control means for applying an adjustable torque to said supply reel and take-up reel control means for applying an adjustable torque to said take-up reel.

10. The apparatus of claim 9, wherein said reel control indicator comprises a supply reel control indicator for producing a feedback signal representative of any change in position of said supply reel resulting from said adjustable torque applied to said supply reel and a take-up reel control indicator for producing a feedback signal representative of any change in position of said take-up reel resulting from said adjustable torque applied to said take-up reel.

11. The apparatus of claim 10, wherein said tape advancement means comprises:

a roller for contacting said portion of said tape; and a roller motor, coupled to said roller, for producing motion of said roller, said roller advancing said tape between said supply reel and said take-up reel.

12. The apparatus of claim 11, wherein said desired tension produced in said tape is substantially constant.

13. The apparatus of claim 1, wherein said processing means further produces a tape status diagnostic signal in response to said reference signal and said feedback signal, said tape status diagnostic signal indicating the volume of said tape stored on said reel.

14. The apparatus of claim 1, wherein said desired tension produced in said tape is substantially constant.

15. The apparatus of claim 1, wherein said processing means compares said reference signal and said feedback signal to produce a comparison signal, said control signal having a magnitude that is a predetermined function of said comparison signal.

16. The apparatus of claim 15, wherein said processing means comprises a microprocessor and memory device, said microprocessor determining said magnitude of said control signal as a function of said comparison signal by referring to a table of empirically derived data stored in said memory device, said data correlating said comparison signal and said control signal.

17. A thermal transfer printer for transferring marking material from a transfer ribbon onto adjacent receiving paper in a predetermined pattern, said transfer ribbon being transferable between ribbon supply and ribbon take-up reels and said paper being transferable between paper supply and paper take-up reels, said printer comprising:

a thermal print head for effecting the desired transfer of said marking material from said transfer ribbon onto said receiving paper, said print head being positioned adjacent said transfer ribbon between said ribbon supply and ribbon take-up reels;

a roller, positioned adjacent said receiving paper, for maintaining the desired orientation of said transfer ribbon and said receiving paper with respect to said print head;

a roller motor, coupled to said roller, for producing motion of said roller allowing said roller to maintain said desired orientation of said transfer ribbon and said receiving paper with respect to said print head;

a ribbon take-up reel motor, coupled to said ribbon take-up reel, for applying an adjustable torque to said ribbon take-up reel;

a ribbon and paper advancement indicator for producing a reference signal representative of any change in said desired orientation of said ribbon and paper with respect to said print head;

a ribbon take-up reel control indicator for producing a ribbon take-up feedback signal representative of any change in position of said ribbon take-up reel resulting from said adjustable torque applied by said ribbon take-up reel motor, said processing means producing a paper take-up control signal in reel motor; and processing means for producing a ribbon take-up control signal in response to said reference signal and said ribbon take-up feedback signal, said ribbon take-up control signal being provided to said ribbon take-up reel motor to adjust said torque applied to said ribbon take-up reel sufficiently to produce the desired tension in said ribbon between said roller and said ribbon take-up reel.

18. The thermal transfer printer of claim 17, further comprising:

a paper take-up reel motor, coupled to said paper take-up reel, for applying an adjustable torque to said paper take-up reel; and a paper take-up reel control indicator for producing a paper take-up feedback signal representative of any change in position of said paper take-up reel resulting from said adjustable torque applied by said paper take-up reel motor, said processing means producing a paper take-up control signal in response to said reference signal and said paper take-up feedback signal, said paper take-up control signal being provided to said paper take-up reel motor to adjust said torque applied to said paper take-up reel sufficiently to produce the desired tension in said paper between said roller and said paper take-up reel.

19. The thermal transfer printer of claim 18, wherein said roller motor is an electric stepper motor, said processing means producing a stepper motor control signal comprising a plurality of energy pulses, said stepper motor control signal being supplied to said stepper motor and producing a predetermined amount of stepper motor rotation for each energy pulse received.

20. The thermal transfer printer of claim 19, wherein said ribbon and paper advancement indicator monitors the number of energy pulses supplied to said stepper motor to determine said reference signal.

21. The thermal transfer printer of claim 18, wherein said ribbon take-up reel motor and said paper take-up reel motor are direct current electric motors.

22. The thermal transfer printer of claim 18, wherein:

said processing means compares said reference signal and said ribbon take-up feedback signal to produce a first comparison signal, said ribbon take-up control signal having a magnitude that is a predetermined function of said first comparison signal; and said processing means compares said reference signal and said paper take-up feedback signal to produce a second comparison signal, said paper take-up control signal having a magnitude that is a predetermined function of said second comparison signal.

23. The thermal transfer printer of claim 22, wherein said processing means and said ribbon and paper advancement indicator comprise a microprocessor, said magnitude of said ribbon take-up and paper take-up control signals being determined from said first and second comparison signals by reference to first and second tables respectively.

24. The thermal transfer printer of claim 18, further comprising:

a paper supply reel motor, coupled to said paper supply reel, for applying an adjustable torque to said paper supply reel; and a paper supply reel control indicator for producing a paper supply feedback signal representative of any change in position of said paper supply reel resulting from said adjustable torque applied by said paper supply reel motor, said processing means producing a paper supply control signal in response to said reference signal and said paper supply feedback signal, said paper supply control signal being provided to said paper supply reel motor to adjust said torque applied to said paper supply reel sufficiently to produce the desired tension in said paper between said roller and said paper supply reel.

25. The thermal transfer printer of claim 17, further comprising:

a ribbon supply reel motor, coupled to said ribbon supply reel, for applying an adjustable torque to said ribbon supply reel; and a ribbon supply reel control indicator for producing a ribbon supply feedback signal representative of any change-in position of said ribbon supply reel resulting from said adjustable torque applied by said ribbon supply reel motor, said processing means producing a ribbon supply control signal in response to said reference signal and said ribbon supply feedback signal, said ribbon supply control signal being provided to said ribbon supply reel motor to adjust said torque applied to said ribbon supply reel sufficiently to produce the desired tension in said ribbon between said roller and said ribbon supply reel.

26. The process of maintaining a desired tension in a tape disposed between an advancement device and a rotatable reel, said advancement device being operable to advance said tape by a predetermined distance, the method comprising the steps of:

producing a reference signal in response to the operation of said advancement device;

producing a first feedback signal in response to the operation of said reel;

comparing said reference signal and said first feedback signal to produce a first comparison signal; and adjusting the operation of said reel in response to said first comparison signal to maintain said desired tension in said tape substantially independent of the operation of said advancement means.

27. The process of claim 26, further comprising the steps of:

producing a second feedback signal in response to the operation of a second said reel;

comparing said reference signal and said second feedback signal to produce a second comparison signal; and adjusting the operation of said second reel in response to said second comparison signal to maintain said desired tension in said tape substantially independent of the operation of said advancement means.

28. The process of claim 26, further comprising the step of producing at least one tape status diagnostic signal in response to said first and second comparison signals.

29. The process of claim 26, wherein said desired tension maintained in said tape is substantially constant.

30. The process of claim 26, wherein:

said step of producing a reference signal in response to the operation of said advancement device comprises producing a reference signal indicative of the angular velocity of a rotatable roller that contacts said tape and advances said tape as it rotates; and said step of producing a first feedback signal in response to the operation of said reel comprises producing a first feedback signal indicative of the angualr velocity of said reel.

31. The process of claim 26, wherein:

said step of producing a reference signal in response to the operation of said advancement device comprises producing a reference signal indicative of the radius of a rotatable roller that contacts said tape and advances said tape as it rotates; and said step of producing a first feedback signal in response to the operation of said reel comprises producing a first feedback signal indicative of the combined radius of said reel and said tape stored on said reel.

* * * * *

UNITED STATES PATENT AND TRADEMARK OFFICE
CERTIFICATE OF CORRECTION

PATENT NO. : 4,788,558

DATED : November 29, 1988

INVENTOR(S) : Edward D. Caldwell; David A. Ballard

It is certified that error appears in the above-identified patent and that said Letters Patent is hereby corrected as shown below:

In claim 17, column 18, lines 64-66, delete "said processing means producing a paper take-up control signal in reel motor;" line 64, after motor delete the "," and insert a --;--.

In claim 25, column 20, line 14, delete "change-in" and substitute therefor --change in--.

Signed and Sealed this

First Day of August, 1989

*Attest:*

DONALD J. QUIGG

*Attesting Officer*

*Commissioner of Patents and Trademarks*